US00RE42431E

(19) United States
(12) Reissued Patent
Lee et al.

(10) Patent Number: US RE42,431 E
(45) Date of Reissued Patent: Jun. 7, 2011

(54) OPTICAL DISC HAVING UNIFORM STRUCTURE

(75) Inventors: Kyung-geun Lee, Seongnam-si (KR); In-sik Park, Suwon-si (KR); Du-Seop Yoon, Suwon-si (KR)

(73) Assignee: Samsung Electronics Co., Ltd., Suwon-si (KR)

(21) Appl. No.: 12/246,733

(22) Filed: Oct. 7, 2008

Related U.S. Patent Documents

Reissue of:

(64) Patent No.: 7,123,559
Issued: Oct. 17, 2006
Appl. No.: 10/771,317
Filed: Feb. 5, 2004

U.S. Applications:

(63) Continuation of application No. 10/128,530, filed on Apr. 24, 2002, now Pat. No. 7,065,015.

(30) Foreign Application Priority Data

May 2, 2001 (KR) ..... 2001-23747
Sep. 29, 2001 (KR) ..... 2001-61041

(51) Int. Cl.
*G11B 7/00* (2006.01)

(52) U.S. Cl. ..... 369/47.27; 369/275.3; 369/44.13

(58) Field of Classification Search ..... 369/47.27, 369/275.3, 44.13, 44.26, 275.4, 59.25
See application file for complete search history.

(56) References Cited

U.S. PATENT DOCUMENTS

| | | | |
|---|---|---|---|
| 5,648,954 | A | 7/1997 | Satoh |
| 6,128,259 | A | 10/2000 | Sofue et al. |
| 6,339,571 | B1 | 1/2002 | Torazawa et al. |
| 6,621,772 | B2 | 9/2003 | Asano |
| 6,700,843 | B1 | 3/2004 | Kuroda |
| 6,708,299 | B1 | 3/2004 | Xie |
| 7,065,015 | B2 | 6/2006 | Lee et al. |
| 7,164,647 | B2 | 1/2007 | Lee et al. |
| 7,376,071 | B2 | 5/2008 | Lee et al. |
| 7,414,957 | B2 | 8/2008 | Lee et al. |
| 7,423,956 | B2 | 9/2008 | Lee et al. |
| 2002/0027869 | A1 | 3/2002 | Morita et al. |

FOREIGN PATENT DOCUMENTS

| | | |
|---|---|---|
| CN | 1277426 | 12/2000 |
| EP | 0 628 952 | 12/1994 |
| EP | 0 865 036 | 9/1998 |
| JP | 5-290383 | 11/1993 |
| JP | 9-120584 | 5/1997 |

(Continued)

OTHER PUBLICATIONS

U.S. Appl. No. 12/256,718, filed Oct. 23, 2008, Kyung-geun Lee et al., Samsung Electronics Co., Ltd.

(Continued)

*Primary Examiner* — Nabil Z Hindi
(74) *Attorney, Agent, or Firm* — NSIP Law

(57) ABSTRACT

An optical disc is manufactured under a uniform condition by forming grooves and lands on the entire surface of the disc. The optical disc is configured to obtain a reliable reproduction signal, and the grooves and lands are formed on a lead-in area, a user data area and a lead-out area of the optical disc. Since the same manufacturing condition can be adopted in mastering discs, the yield can be enhanced and the manufacturing cost can be reduced.

6 Claims, 11 Drawing Sheets

FOREIGN PATENT DOCUMENTS

| | | |
|---|---|---|
| JP | 10-222874 | 8/1998 |
| JP | 10-241298 | 9/1998 |
| JP | 2002-260240 | 9/2002 |

OTHER PUBLICATIONS

Office Action issued by Canadian Intellectual Property Office in Canadian Patent Application No. 2,491,189 on Mar. 30, 2009.
"Data Interchange on 120 mm Optical Disc using DVD+RW Format— Capacity: 3,0 Gigabytes and 6,0 Gigabytes", Draft Standard ECMA- . . . 3rd draft—Nov. 1997, pp. 6, 7, 13, 26, 27 and 31.
Office Action issued in Chinese Patent Application No. 2004100749276 on Nov. 4, 2004.
U.S. Appl. No. 11/960,140, filed Dec. 19, 2007, Kyung-geun Lee et al., Samsung Electronics Co., Ltd.
U.S. Appl. No. 11/960,104, filed Dec. 19, 2007, Kyung-geun Lee et al., Samsung Electronics Co., Ltd.
U.S. Appl. No. 11/960,078, filed Dec. 19, 2007, Kyung-geun Lee et al., Samsung Electronics Co., Ltd.
U.S. Appl. No. 11/960,046, filed Dec. 19, 2007, Kyung-geun Lee et al., Samsung Electronics Co., Ltd.
U.S. Appl. No. 11/960,012, filed Dec. 19, 2007, Kyung-geun Lee et al., Samsung Electronics Co., Ltd.
U.S. Appl. No. 11/959,977, filed Dec. 19, 2007, Kyung-geun Lee et al., Samsung Electronics Co., Ltd.
U.S. Appl. No. 11/959,953, filed Dec. 19, 2007, Kyung-geun Lee et al., Samsung Electronics Co., Ltd.
U.S. Appl. No. 11/959,931, filed Dec. 19, 2007, Kyung-geun Lee et al., Samsung Electronics Co., Ltd.
U.S. Appl. No. 11/959,900, filed Dec. 19, 2007, Kyung-geun Lee et al., Samsung Electronics Co., Ltd.
U.S. Appl. No. 11/959,850, filed Dec. 19, 2007, Kyung-geun Lee et al., Samsung Electronics Co., Ltd.
U.S. Appl. No. 11/959,829, filed Dec. 19, 2007, Kyung-geun Lee et al., Samsung Electronics Co., Ltd.
U.S. Appl. No. 11/959,801, filed Dec. 19, 2007, Kyung-geun Lee et al., Samsung Electronics Co., Ltd.
U.S. Appl. No. 11/959,780, filed Dec. 19, 2007, Kyung-geun Lee et al., Samsung Electronics Co., Ltd.
U.S. Appl. No. 11/959,743, filed Dec. 19, 2007, Kyung-geun Lee et al., Samsung Electronics Co., Ltd.
U.S. Appl. No. 11/959,724, filed Dec. 19, 2007, Kyung-geun Lee et al., Samsung Electronics Co., Ltd.
U.S. Appl. No. 11/959,671, filed Dec. 19, 2007, Kyung-geun Lee et al., Samsung Electronics Co., Ltd.
U.S. Appl. No. 11/959,654, filed Dec. 19, 2007, Kyung-geun Lee et al., Samsung Electronics Co., Ltd.
U.S. Appl. No. 11/959,635, filed Dec. 19, 2007, Kyung-geun Lee et al., Samsung Electronics Co., Ltd.
U.S. Appl. No. 11/959,599, filed Dec. 19, 2007, Kyung-geun Lee et al., Samsung Electronics Co., Ltd.
U.S. Appl. No. 11/959,583, filed Dec. 19, 2007, Kyung-geun Lee et al., Samsung Electronics Co., Ltd.
U.S. Appl. No. 11/959,563, filed Dec. 19, 2007, Kyung-geun Lee et al., Samsung Electronics Co., Ltd.
U.S. Appl. No. 11/959,526, filed Dec. 19, 2007, Kyung-geun Lee et al., Samsung Electronics Co., Ltd.
U.S. Appl. No. 11/959,512, filed Dec. 19, 2007, Kyung-geun Lee et al., Samsung Electronics Co., Ltd.

OPTICAL DISC HAVING UNIFORM STRUCTURE

Matter enclosed in heavy brackets [ ] appears in the original patent but forms no part of this reissue specification; matter printed in italics indicates the additions made by reissue.

CROSS-REFERENCE TO RELATED APPLICATIONS

This application is a *reissue of U.S. Pat. No. 7,123,559, the disclosure of which is incorporated by reference, which is a* continuation application of U.S. pat. Ser. No. 10/128,530, filed Apr. 24, 2002 *now U.S. Pat. No. 7,065,015*, which claims the benefit of Korean Application Nos. 2001-61041, filed Sep. 29, 2001 and 2001-23747, filed May 2, 2001, in the Korean Industrial Property Office, the disclosures of which are incorporated herein by reference.

BACKGROUND OF THE INVENTION

1. Field of the Invention

The present invention relates to an optical disc which can be manufactured under uniform conditions by forming grooves and lands on the entire surface of the disc having a lead-in area, a user data area and a lead-out area, and which is configured to obtain a highly reliable recording/reproduced signal.

2. Description of the Related Art

In general, optical discs are widely employed as information recording media for an optical pickup device which records/reproduces information in a non-contact manner. They are classified into compact discs (CDs) and digital versatile discs (DVDs) according to information recording capacity. Furthermore, a DVD disc capable of writing, erasing and reading information can be sub-divided into a digital versatile disc-random access memory (DVD-RAM) disc and a digital versatile disc-rewritable (DVD-RW) disc.

FIG. 1 shows a conventional DVD-RAM or DVD-RW disc having a lead-in area 10, a user data area 20 and a lead-out area 30. The lead-in area 10 contains read only data, such as the disc size, number of track layers on a readable plane or illegal copy preventing information. The user data area 20 contains user data that can be repeatedly read and/or written. The lead-out area 30 contains other disc-related information.

FIG. 1 further shows a partially enlarged view of the lead-in area 10 (a portion A), the user data area 20 (a portion C) and the lead-out area 30 (a portion B). In the lead-in area 10 and the lead-out area 30, pits 15 are used to record read only data.

In the user data area 20, grooves 23 and lands 25 are alternatively formed to accommodate recording and/or reproducing information marks 27 along a predetermined track. Here, a reference numeral 40 denotes a reproduction beam.

A noticeable difference between a DVD-RAM and a DVD-RW is a physical area provided for recording. In other words, the DVD-RAM performs recording on both the lands 25 and the grooves 23, while the DVD-RW performs recording only on the grooves 23. Application of these two standard formats results in the following problems.

First, while a DVD-RW having the same physical recording structure as a DVD-ROM (read only disc) has an excellent reproduction compatibility in DVD-ROM drives or DVD players, a DVD-RAM having a phase difference corresponding to depths of a land and a groove requires hardware modification to suitably track lands and grooves. Therefore, a conventional DVD-RAM has a poor reproduction compatibility.

Second, in the context of recording/reproduction characteristics or injection-molding characteristics in recording data on a groove, the grooves formed in a DVD-RW are two or more times shallower than that in a DVD-RAM. Here, if necessary, read only data is formed on the lead-in area 10 in a form of pits 15.

FIG. 2 shows a graph illustrating an amplitude ratio of a reproduced signal with respect to a pit depth represented in A/n unit for a wavelength (λ) of a reproduced beam to a refractive index (n) of a disc. In cases where the lengths of a recording mark for the minimum recording mark length T are 3T and 14T, the amplitude ratios denoted by $m_1$ and $m_2$ are in a range of between 0.2 and 0.3 where the pit depth (corresponding to a groove depth of a DVD-RW) is approximately 0.06 in λ/n unit. The amplitude ratio is approximately 1 where the pit depth is approximately 0.25. Accordingly, the signal level at the pit depth of λ/12n is approximately 30% (1:0.3) as compared to the case where the pit depth is λ/4n. Therefore, a reliable pit signal cannot be obtained where read only data as shallow as a groove depth of a DVD-RW is formed in a DVD-RAM.

Third, there is a demand for a multi-layered optical disc having a plurality of recording layers, looking from the direction of an incident beam, to enhance the recording capacity. FIG. 3 shows a dual recording layer disc having a first recording layer L0 and a second recording layer L1. A recording laser passes through the first recording layer L0 where a recording is performed on the second recording layer L1. In this case, there is a difference in light power between a pit portion and a groove portion. Also, where a physical header representing a basic recording unit in a data area is used, there is a difference in light transmittance because unlike the recording area, the physical header area always remains crystallized.

FIG. 4 shows a graph illustrating light power for each of a mirror portion, pit portion, groove portion and a groove portion with marks. As shown in FIG. 4, the physical geometry of the first recording layer L0 affects the light power.

Table 1 below lists conditions used in the light power experiments.

TABLE 1

| Parameter | Condition |
|---|---|
| Wavelength (nm) | 400 |
| Numerical aperture (NA) | 0.65/0.85 |
| Minimum mark length (μm) | 0.275/0.194 |
| Modulation | EFM + (Eight-to-Fourteen Modulation-plus) |
| Track pitch (μm) | 0.30, 0.34, 0.38 |
| Reflectivity (%) | Rc = 25, Rs = S |

In Table 1, Rc represents the reflectivity of a crystallized portion of a recording layer and Ra represents the reflectivity of an amorphous portion of a recording layer. According to the experimental results, the smallest decrease in the light power was found in the mirror portion. The light power gradually decreased, in order, with the physical geometry of a pit portion, a groove portion and a groove portion with marks. FIG. 3 shows that a recording/reproducing beam 40 is trapped over a boundary of the lead-in area 10 of the first recording layer L0 and the data area 20 having grooves. Accordingly, the amount of the light beam irradiated onto the second recording layer L1 is different from the case where a recording/reproducing beam 40 extends over only to the grooves.

Therefore, the groove portion with marks adversely affects the recording power as the data is written on the second recording layer L1 of the dual-layered optical disc, resulting in a poor recording/reproduction efficiency.

Fourth, in order to reduce a spot size of a reproducing beam to attain high-density, a numerical aperture (NA) should be increased. However, the problem with a dual recording layer disc is that a difference in light power becomes more serious as the NA increases. Factors causing the difference in the light power with increased NA are listed in Table 2 below.

TABLE 2

| Item | Parameter | Example |
|---|---|---|
| Dual recording layers | Structure of first recording layer | Grooves, pits, etc., |
| High NA | Number of tracks trapped by beam | 85 for NA 0.65<br>160 for NA 0.85 |
| | Incident angle of beam | 40.5° for NA 0.65<br>58.2° for NA 0.85 |

As shown in Table 2, with the grooves and pits formed on the first recording layer of a dual recording layer disc, the number of tracks trapped by a beam and the incident beam angle increase as the NA is increased.

Finally, the manufacturing conditions of the disc mastering may vary depending on different structures of the disc in a lead-in area (pits), a data area (grooves) and a lead-out area (pits). This makes the manufacturing process complex, resulting in a poor yield and an increased manufacturing cost.

SUMMARY OF THE INVENTION

Accordingly, it is an object of the present invention to provide an optical disc with an improved yield, a reduced manufacturing cost and an improved recording/reproducing capacity, by forming grooves in both a lead-in area and a lead-out area so as to have the same manufacturing conditions for discs during mastering.

It is another object of the present invention to provide an optical disc having an improved structure of multiple recording layers such that light power is uniformly irradiated to the multi-layered disc during recording/reproducing.

Additional objects and advantages of the invention will be set forth in part in the description which follows, and, in part, will be obvious from the description, or may be learned by practice of the invention.

To achieve the above and other objects of the present invention, there is provided an optical disc for recording and/or reproduction, wherein grooves and lands are provided to a lead-in area, a user data area and a lead-out area of the optical disc.

According to an aspect of the present invention wobbles are formed on at least one side of the grooves and lands as read only data.

According to another aspect of the present invention, the wobbles in the lead-in area, the user data area and the lead-out area may be modulated by the same modulation technique or by different modulation techniques.

The wobbles may be modulated by a Quadrature Phase Shift Keying (QPSK) technique or by a Modified Amplitude Modulation (MAM) technique in which a wobbled portion of a single frequency having a predetermined period and a non-wobbled portion having a predetermined period are merged.

Alternatively, the wobbles may be modulated by a frequency modulation technique, an amplitude modulation technique, a phase modulation technique, a minimum shift keying (MSK) modulation technique or a saw tooth wobble (STW) modulation technique.

On the other hand, the wobbles in the user data area may be modulated by at least one selected from a QPSK modulation, a frequency modulation, an amplitude modulation, a MAM modulation, a phase modulation, a MSK modulation and a STW modulation, and the wobbles in the lead-in area and the lead-out area are modulated by a modulation technique different from that of the wobbles in the user data area.

The optical disc according to the present invention comprises at least one recording layer.

An optical disc for recording and/or reproduction according to another embodiment of the present invention comprises a lead-in area, a user data area and a lead-out area, wherein each have grooves and lands formed thereon, and data in the user data area is recorded on at least one side of the lands and grooves.

An optical disc for recording and/or reproduction according to yet another embodiment of the present invention comprises a lead-in area, a user data area and a lead-out area, wherein each have grooves and lands formed thereon, and the lead-in area further includes a read only data area and a write/read data area.

BRIEF DESCRIPTION OF THE DRAWINGS

These and other objects and advantages of the present invention will become more apparent and more readily appreciated from the following description of the preferred embodiment, taken in conjunction with the accompanying attached drawings in which.

DETAILED DESCRIPTION OF THE PREFERRED EMBODIMENTS

Figure 1:
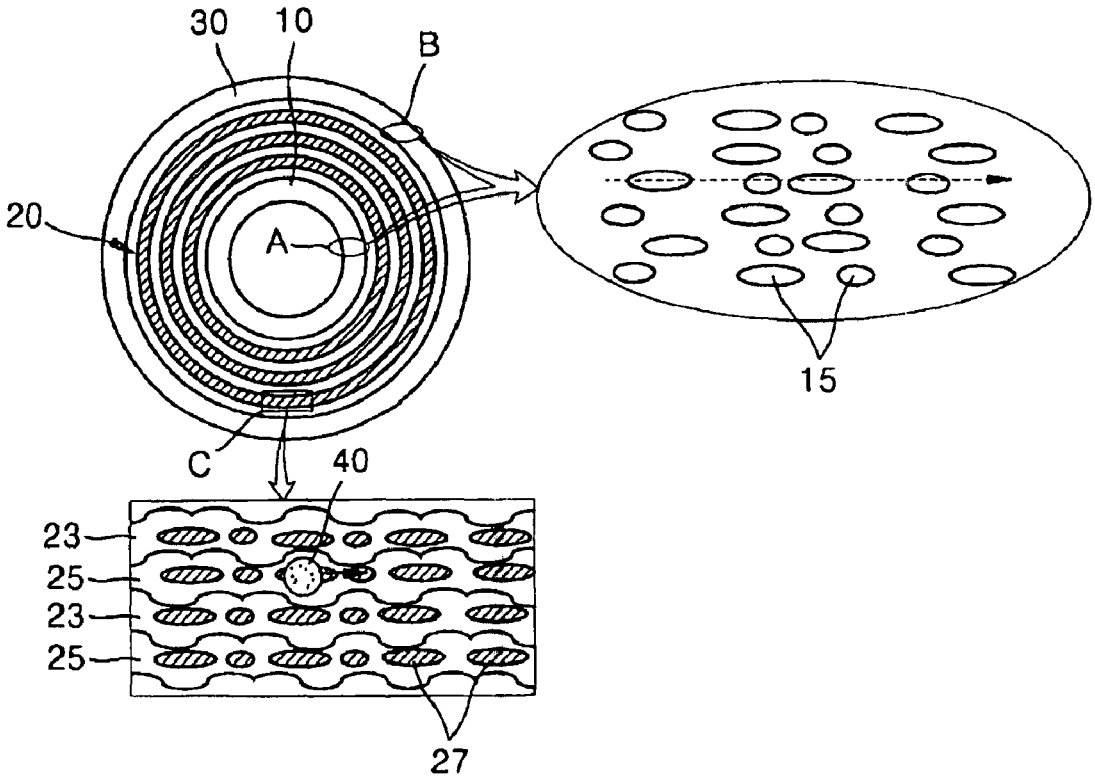
FIG. 1 is a diagram of a conventional optical disc with enlarged views illustrating portions A, B and C.
Figure 2:
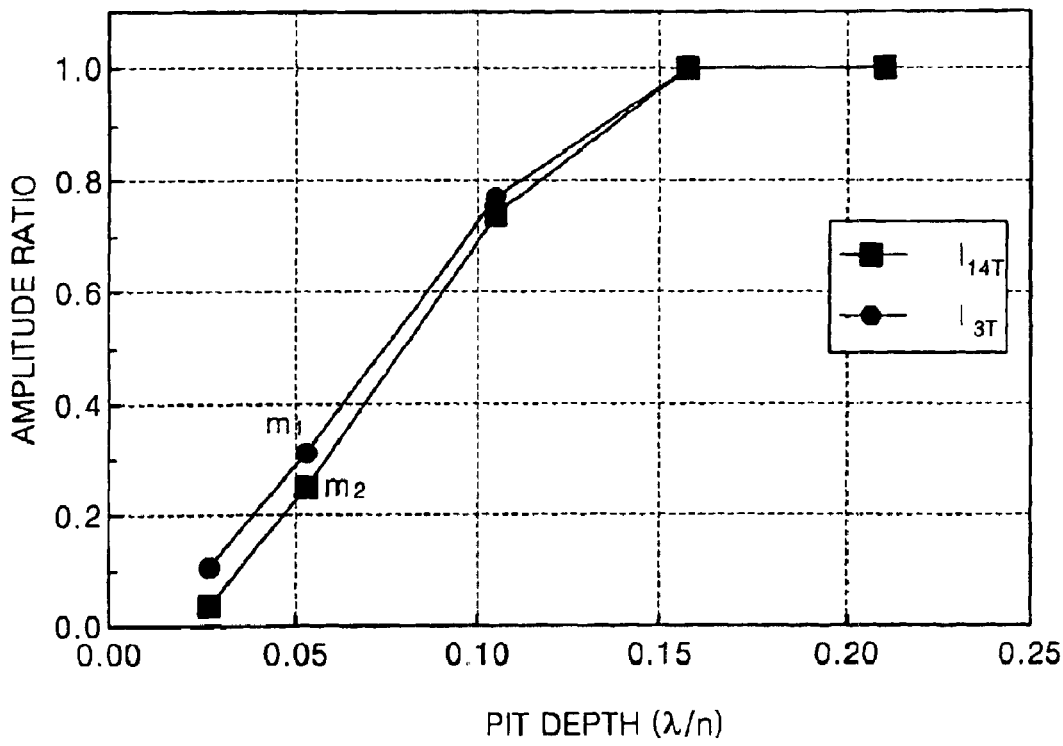
FIG. 2 is a graph illustrating the amplitude ratio of a reproduced signal with respect to a pit depth.
Figure 3:
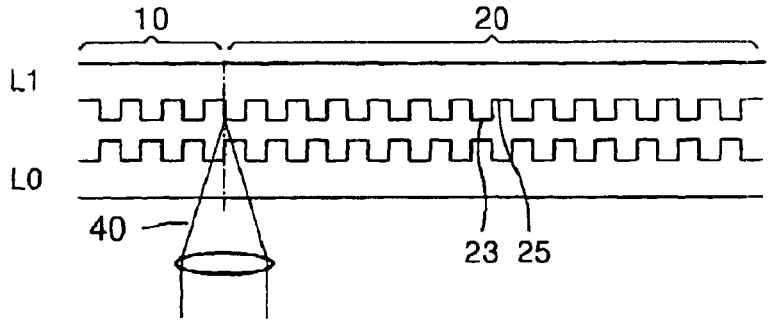
FIG. 3 is a diagram of a partial cross-sectional view illustrating a conventional optical disc.
Figure 4:
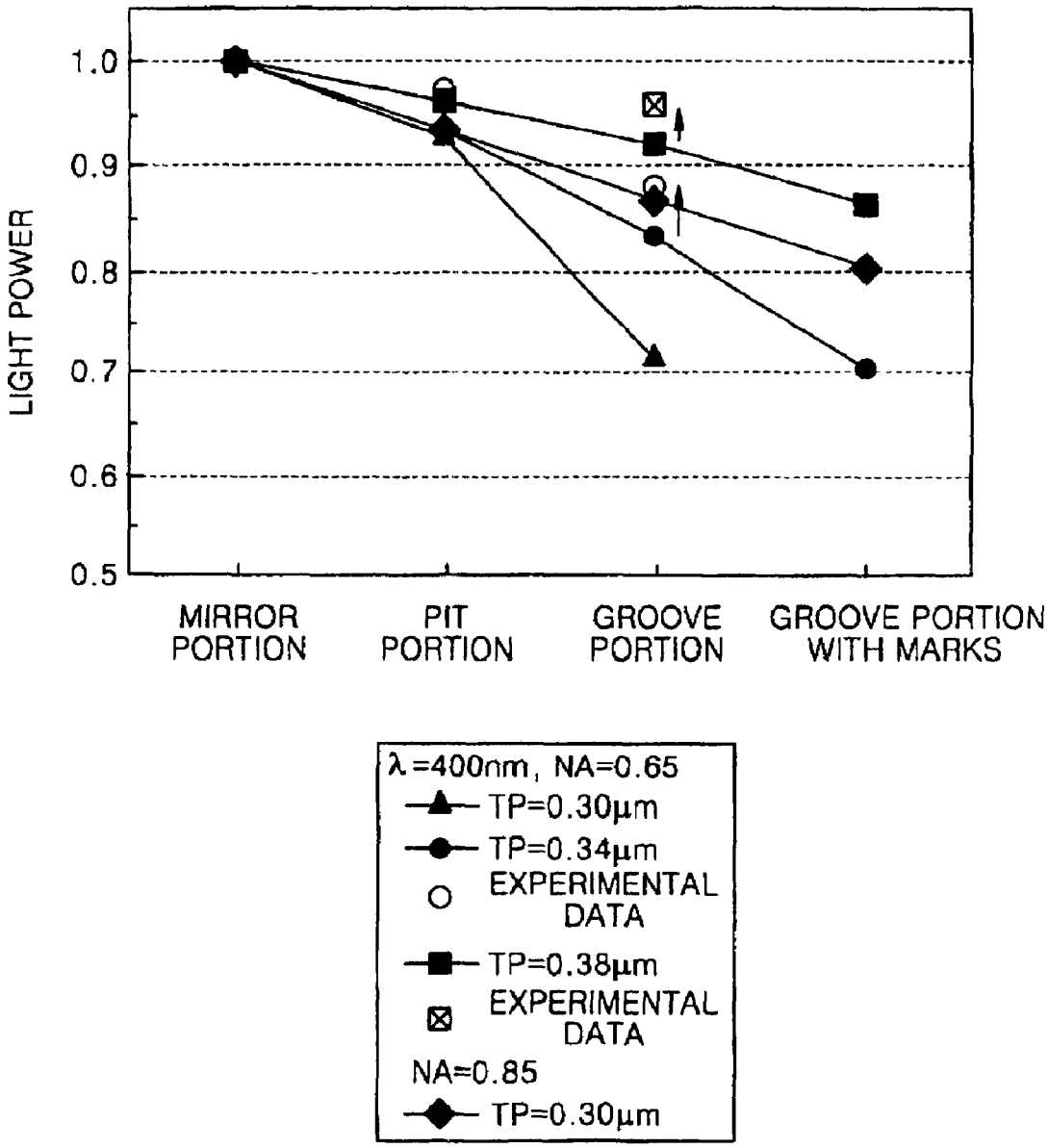
FIG. 4 is a graph illustrating light power with respect to a mirror portion, a pit portion, a groove portion and a groove portion with marks.
Figure 5:
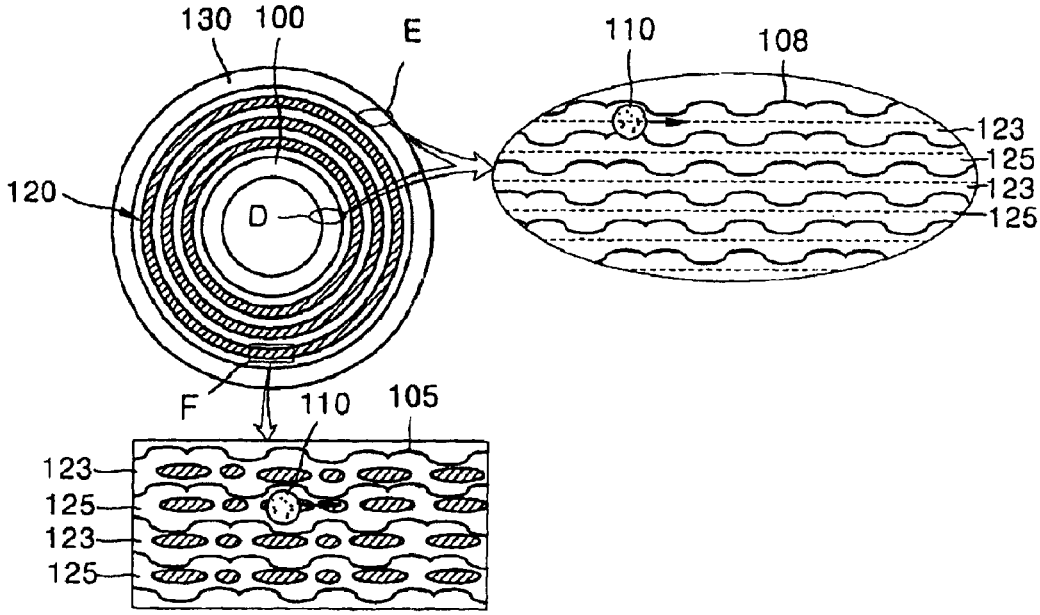
FIG. 5 is a diagram of an optical disc according to an embodiment of the present invention with enlarged views illustrating portions D, E and F.

FIG. 5 shows an optical disc according to an embodiment of the present invention. The optical disc includes a lead-in area 100, a user data area 120 and a lead-out area 130, and grooves 123 and lands 125 that are formed on the entire surface thereof. User data can be recorded on only the grooves 123 or on both the grooves 123 and the lands 125. Where read only data is recorded, waveforms of wobble signals 105 are consecutively recorded on at least one side of the grooves 123 and lands 125, instead of pits.

An enlarged view of portions D and E shows that the grooves 123 and the lands 125 are alternately formed in the lead-in and lead-out areas 100 and 130, and waveform wobble signals 108 are formed on both the grooves 123 and the lands 125. A portion F shows that the grooves 123 and the lands 125 are alternately formed in the user data area 120, and the wobble signals 105 are formed on both the grooves 123 and the lands 125. Recording and/or reproduction are performed while a recording/reproduction beam 110 travels along groove and/or land tracks.

Figure 6:
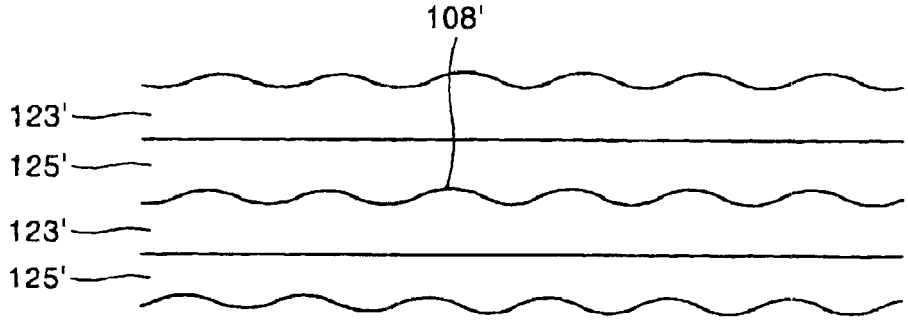
FIG. 6 is a diagram illustrating a one-side wobbling method adopted by an optical disc according to the present invention.

FIG. 6 shows a one-side wobbling method in which wobbles 108' are formed on at least one side of the lands 125' and grooves 123'. Alternatively, wobbles may be formed on both sides of the grooves 123' and lands 125'.

Figure 7:
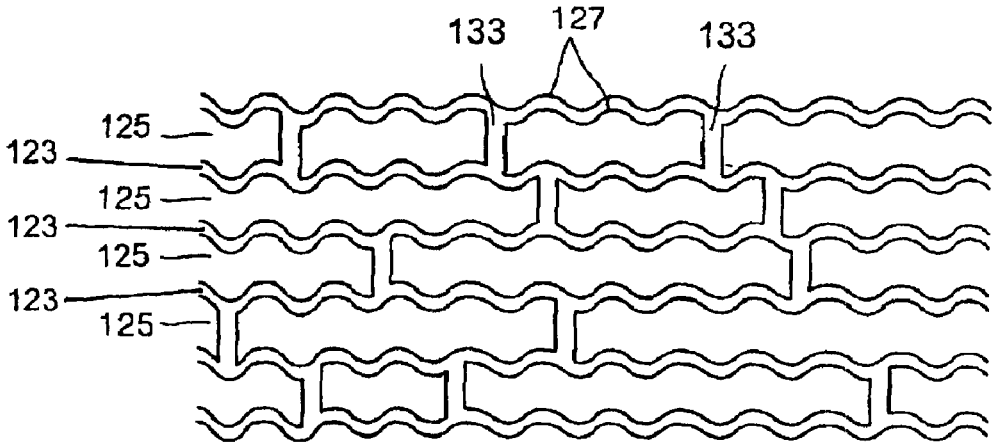
FIG. 7 is a diagram illustrating a wobble-and-land prepit combination method adopted by an optical disc according to the present invention.

FIG. 7 shows that an optical disc according to another embodiment of the present invention may record read only data by a combination of wobbles 127 and land prepits 133 formed on lands 125 at predetermined intervals. The land prepits 133 are formed on a predetermined area during the manufacture of a disc substrate. A pickup device provided in a recording/reproducing apparatus (not shown) can easily move to a desired location using the information recorded in the land prepits 133. Also, the pickup device can identify a sector number or type, a land/groove or the like, and perform a servo control using the information recorded in forms of land prepits.

As described above, the optical disc of the present invention has read only data recorded as wobble signals rather than pits, and the physical geometry of the recording layer is the same throughout the entire surface of the optical disc. Therefore, the optical disc of the present invention having multiple layers has less reduction in light power than a conventional optical disc having multiple layers.

Figure 8A:
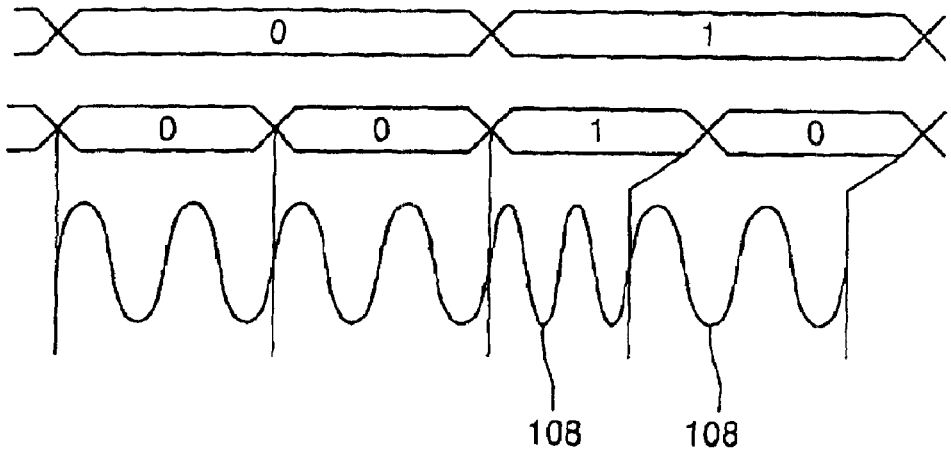
FIG. 8A is a diagram of waveforms obtained from wobbles based on a frequency modulation technique adopted by an optical disc according to the present invention.

FIG. 8A shows an example of a wobble signal modulation adopted by an optical disc of the present invention. Specifically, a frequency modulation technique is used, and -data is memorized by changing frequencies of wobble signals 108 and 108'. For example, data is recorded in combinations of bits of logic "0" or "1". Data is recorded in such a manner that the frequencies of the wobble signals 108 and 108' are made different in cases of the bits of logic "0" and logic "1", respectively. For example, the frequency of the wobble signal of the logic "0" is greater than that of the logic "1", so as to distinguish the bits having logic values "0" and "1".

Figure 8B:
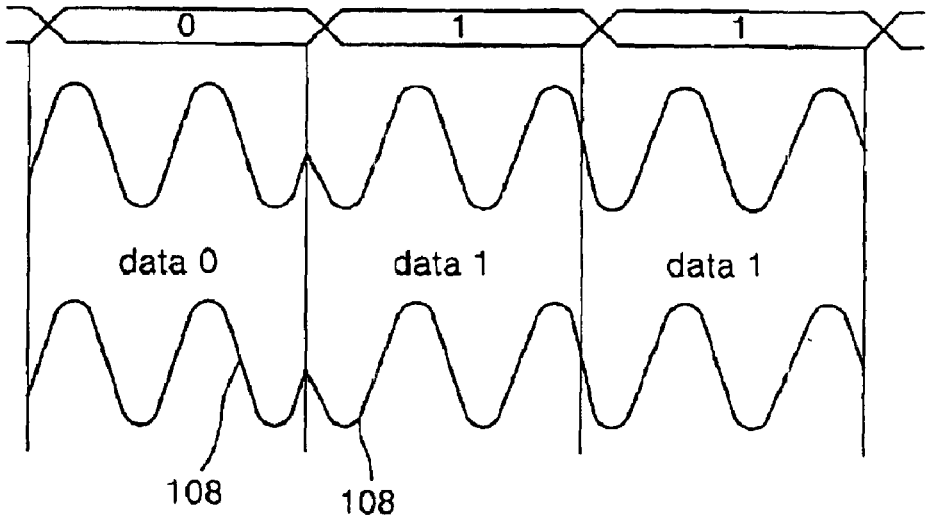
FIG. 8B is a diagram of waveforms obtained from wobbles based on a phase modulation technique adopted by an optical disc according to the present invention.

Alternatively, FIG. 8B shows that a phase modulation technique may be used in recording data, whereby phases of wobble signals 108 and 108' are shifted. That is, data is recorded in such a manner that the phases of the wobble signals in cases of bits of logic "0" and bits of logic "1" are made different. For example, a phase difference of 180° is made between the wobble signal of the logic "0" and the wobble signal of the logic "1".

Figure 8C:
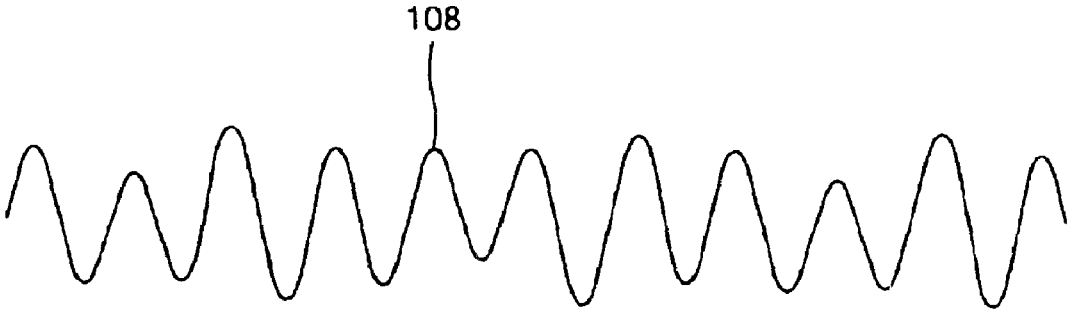
FIG. 8C is a diagram of waveforms obtained from wobbles based on an amplitude modulation technique adopted by an optical disc according to the present invention.

FIG. 8C shows that wobble signals can also be modulated by an amplitude modulation technique. That is, data is recorded in such a manner that amplitudes of wobble signals of bits of logic "0" and "1" are made different.

Figure 8D:
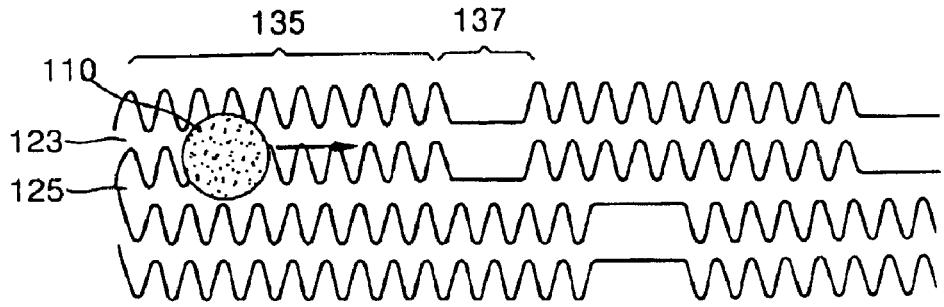
FIG. 8D is a diagram of waveforms obtained from wobbles based on a Modified Amplitude Modulation (MAM) technique adopted by an optical disc according to the present invention.

FIG. 8D shows that data may be recorded by a Modified Amplitude Modulation (MAM) technique, in which a wobbled portion 135 of a single frequency having a predetermined period and/or a non-wobbled portion 137 having a predetermined period, are merged. For example, the lengths of neighboring wobbled portions or the lengths of neighboring non-wobbled portions are made different, thereby recording data.

Figure 9:
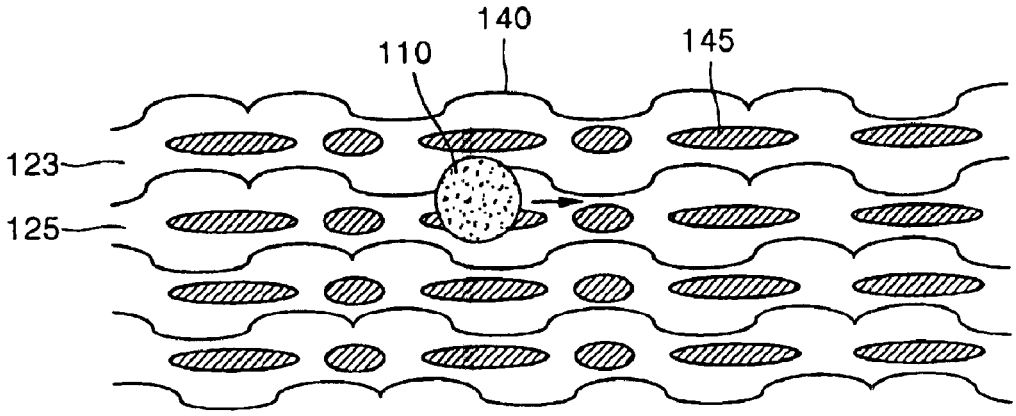
FIG. 9 is a diagram of wobbles based on a Quadrature Phase Shift Keying (QPSK) technique adopted by an optical disc according to the present invention.

In addition, FIG. 9 shows that data can be recorded by a Quadrature Phase Shift Keying (QPSK) modulation, whereby the phases of the respective wobble signals 140 are different from each other at 90°. Here, a reference numeral 145 denotes a recording mark corresponding to user data. As described above, where read only data is recorded as wobble signals, both the user data and the read only data are stored in the groove and/or land tracks, thereby enhancing the utilization efficiency of a recording area of a disc.

Figure 10:
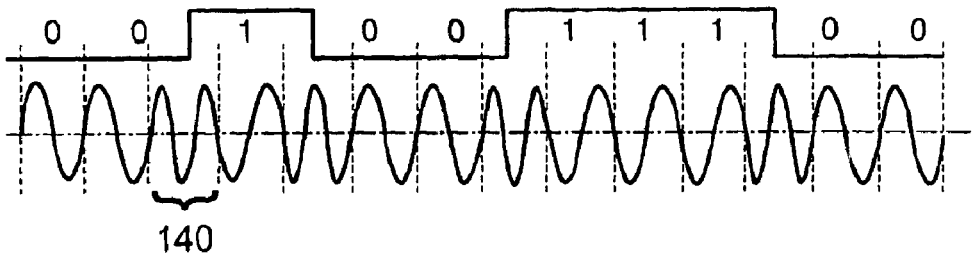
FIGS. 10 is a diagram of waveforms obtained from wobbles based on a Minimum Shift Keying (MSK) modulation technique adopted by an optical disc according to the present invention.

FIG. 10 shows that data can be recorded by a Minimum Shift Keying (MSK) modulation, whereby only the frequencies in a predetermined period comprising consecutive wobble signals 140 are varied.

Figure 11:
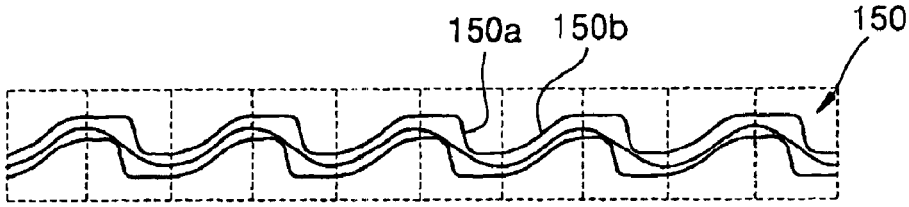
FIG. 11 is a diagram of waveforms obtained from wobbles based on a Surface Transverse Wave (STW) modulation technique adopted by an optical disc according to the present invention.

FIG. 11 shows that a saw tooth wobble (STW) modulation may be employed, whereby saw tooth wobbles 150 are formed. The logic states "0" or "1" of the saw tooth wobbles 150 are determined by the shapes of a relatively sharply sloping portion 150a and a relatively gently sloping portion 150b.

Figure 12:
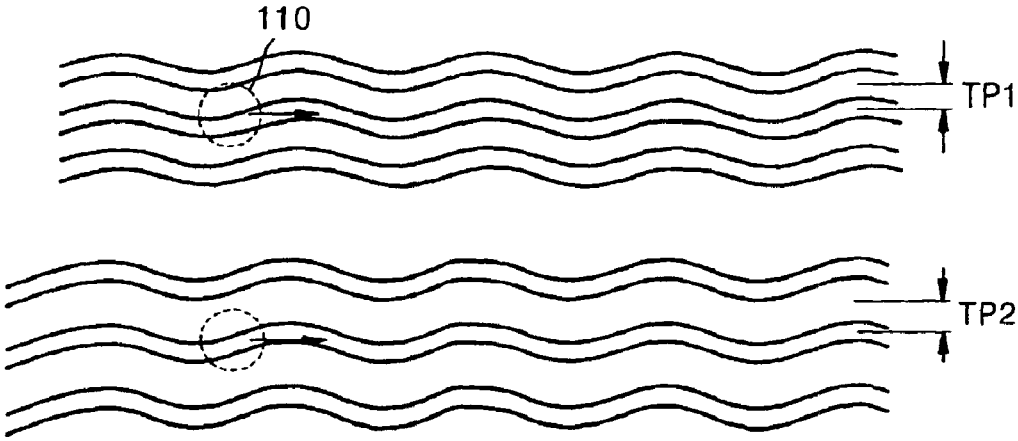
FIG. 12 is a diagram illustrating wobbles with different track pitches adopted by an optical disc according to the present invention.

FIG. 12 shows that a crosstalk between tracks can be reduced by making track pitches TP1 and TP2 of wobbles different.

Figure 13:
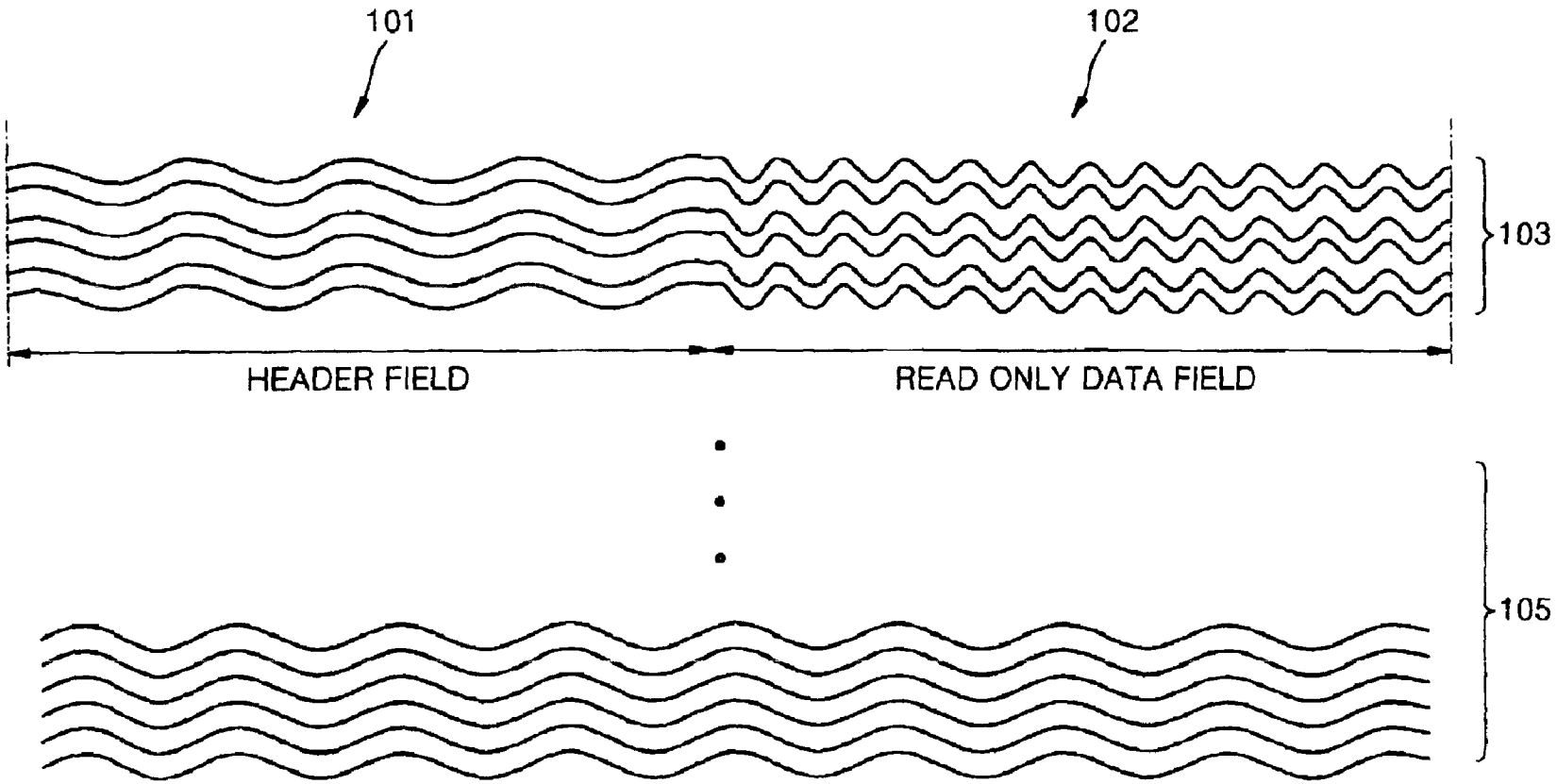
FIG. 13 is a diagram illustrating a lead-in area of an optical disc according to yet another embodiment of the present invention.

FIG. 13 shows a lead-in area of an optical disc according to yet another embodiment of the present invention. That is, a read only data area 103 and a write/read data area 105 are provided in the lead-in area (i.e., 100 shown in FIG. 5) of the optical disc. In the read only data area 103, data is recorded by first wobbles. In the write/read data area 105, second wobbles are formed. The first and second wobbles may be modulated by different modulation techniques or indicated by different specifications. In other words, the first wobbles are modulated by at least one selected from a QPSK modulation, a frequency modulation, an amplitude modulation, a phase modulation a MAM modulation, a MSK modulation and an STW modulation, and the second wobbles are modulated by a modulation technique different from that for the first wobbles.

Figure 14:
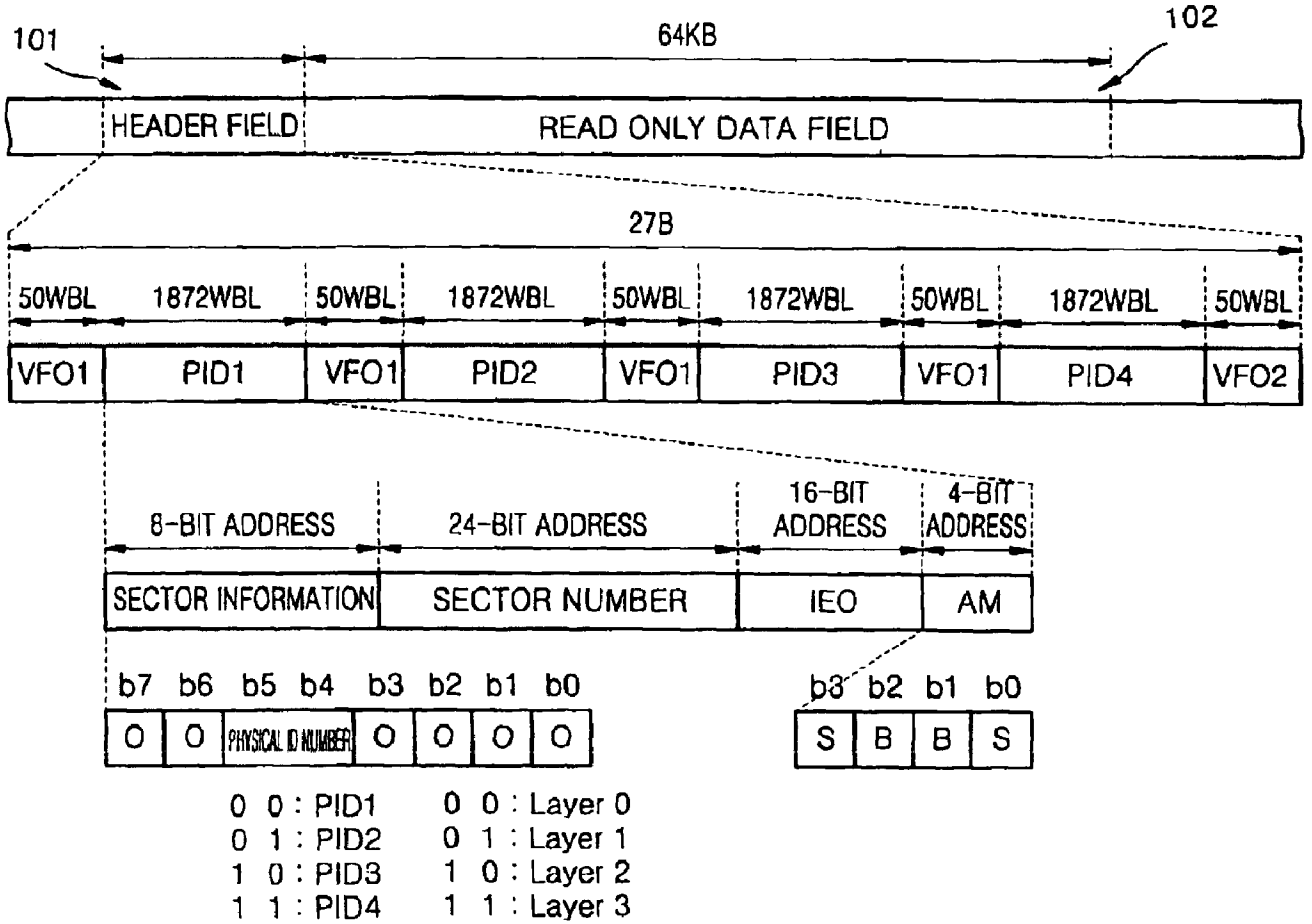
FIG. 14 is a diagram illustrating a header field and a read only data field of the optical disc of FIG. 13.

FIG. 14, with reference to FIG. 13, shows an example of a header field 101 and a read only data field 102 of the optical disc shown in FIG. 13. That is, address information is contained in the entire area of the grooves in the write/read area 105, and the header field 101, indicating the address information, and the read only data field 102 are provided in the read only data area 103. The header field 101 may be positioned at the front or rear of an error correction code (ECC) recording unit or at the interface of ECC recording units. Here, the specification of wobbles in the header field 101 may be identical with or different from that of wobbles in the write/read data area 105 or read only data area 103. In particular, as shown in FIG. 13, wobbles formed in the read only data field 102 of the read only data area 103 are high-frequency wobbles and wobbles formed in the header field 101 and the write/read data area 105 are low-frequency wobbles. This arrangement prevents a reproduction signal from deteriorating as the address information contained in the header field 101 is recorded at high frequency. Also, to reduce the crosstalk between the tracks, track pitches from the write/read data area 105 and the read only data area 103 may be set differently from each other. For example, the track pitch for the read only data area 103 may be greater than that of the write/read data area 105.

The optical disc of the present invention may further include a predetermined area formed for a specific purpose in addition to the lead-in area 100, the data area 120 and the lead-out area 130. For example, the predetermined area may be a burst cutting area (BCA) for copy protection.

Figure 15:
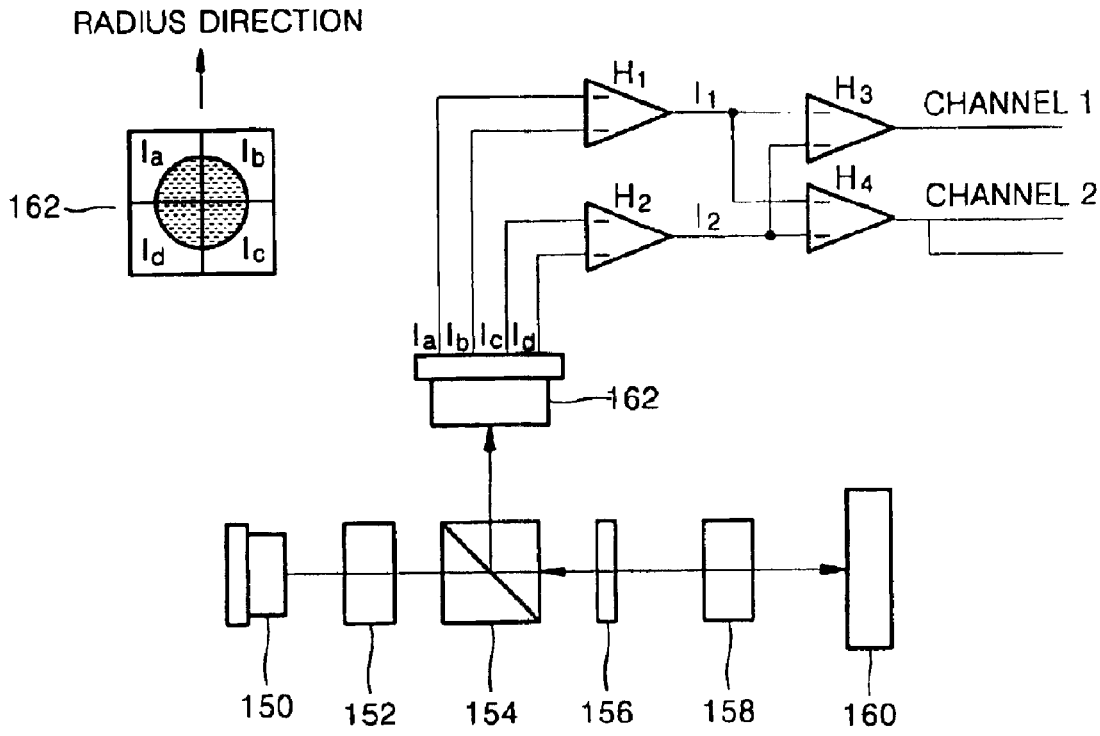
FIG. 15 is a schematic diagram illustrating an example of an optical recording/reproducing system which records and/or reproduces data from an optical disc of the present invention.

FIG. 15 is a schematic diagram illustrating an example of an optical disc recording/reproducing system which records and/or reproduces data from an optical disc of the present invention. The system includes a laser diode 150 which radiates light, a collimating lens 152 which collimates the light radiated from the laser diode 150, a polarizing beam splitter 154 which changes the traveling path of incident light according to the polarization direction of the incident light, a ¼ wavelength plate 156 and an objective lens 158 which focuses the incident light onto an optical disc 160. The light reflected from the optical disc 160 is reflected by the polarizing beam splitter 154 and received by a photodetector, e.g., a quadrant photodetector 162. The light received in the quadrant photodetector 162 is converted into an electrical signal and output to a channel 1, in which the electrical signal is detected as an RF signal, and to a channel 2, in which the electrical signal is detected as a wobble signal by a push-pull method. Here, H1, H2, H3 and H4 denote DC amplifiers, and Ia, Ib, Ic and Id denote first through fourth current signals output from the quadrant photodetector 162.

According to an optical disc of the present invention, read only data can be formed by various modulation schemes described above. In particular, wobble signals can be formed on the lead-in area 100, the lead-out area 130 and the user data area 120 by the same modulation technique.

On the other hand, wobbles can be formed by different modulation techniques according to the disc area, that is, the lead-in area 100, the user data area 120 or the lead-out area 130. For example, at least one selected from a frequency modulation, a phase modulation, an amplitude modulation, a MAM modulation, a QPSK modulation, a MSK modulation and an STW modulation can be employed in the user data area 120. Then, a modulation technique different from that employed in the user data area 120, may be employed in the lead-in area 100 and the lead-out area 130.

To increase the storage capacity, the present invention provides a disc having at least one recording layer. For example, a dual recording-layer disc of the present invention comprises grooves and lands which are formed on the entire surface of the dual recording-layer disc, and read only data which is formed uniformly as wobble signals. Thus, there is no difference in the light power at the boundary between the lead-in area or lead-out area and the user data area. Furthermore, efficiency of a recording area is enhanced because the read only data is recorded as wobble signals, allowing both the user data and the read only data to be stored in the groove and/or land tracks.

In the optical disc according to the present invention, grooves-are consecutively formed throughout the entire surface of the disc, which eases the manufacturability and provides advantages from the viewpoint of controllability of mastering parameters. Also, since the same manufacturing condition can be adopted in mastering discs, the yield can be enhanced and the manufacturing cost can be reduced. Furthermore, the light power can be uniformly adjusted while recording/reproducing data on/from a multiple-layered disc, by forming read only data as wobbles rather than pits.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical recording and/or reproducing apparatus which records and/or reproduces data from an optical disc which includes recording layers, each layer having lead-in, user data and lead-out areas, wherein each of the lead-in, user data and lead-out areas includes a groove and a land formed thereon and wobbles in the lead-in area, the user data area, and the lead-out area are modulated by different modulation techniques, the apparatus comprising:

a laser diode which radiates light;

a collimating lens which collimates the light radiated from the laser diode;

a polarizing beam splitter which changes a path of the light according to a polarization direction of the light;

an objective lens which focuses the light onto the optical disc; and a photodetector which receives the light uniformly irradiated and reflected from the lead-in, user and lead-out areas having the groove and the land formed thereon.

2. The optical recording and/or reproducing apparatus of claim 1, wherein the user data area of the optical disc further includes information which is recorded on at least one side of the land and the groove.

3. The optical recording and/or reproducing apparatus of claim 1, wherein the lead-in area of the optical disc further includes a read only data area and a write/read data area.

4. An optical disc for recording and/or reproduction, comprising:

a lead-in area;

a user data area;

a lead-out area; and a specific purpose area in addition to the lead-in area, the lead-out area and the user data area, wherein:

each of the lead-in area, the user area and the lead-out area includes a groove and a land formed thereon, wobbles in the lead-in area, the user data area and the lead-out area are modulated by different modulation techniques, the wobbles in the user data area are modulated by one of a Quadrature Phase Shift Keying (QPSK) modulation technique, a frequency modulation technique, an amplitude modulation technique, a Modified Amplitude Modulation (MAM) technique, a phase modulation technique, a minimum shift keying (MSK) modulation technique and a saw tooth wobble (STW) modulation technique, the wobbles in the lead-in area and the lead-out area are modulated by at least one different modulation technique from that for the wobbles in the user data area, and the specific purpose area is a burst cutting area (BCA).

5. An optical disc for recording and/or reproduction, comprising:

a lead-in area;

a user data area;

a lead-out area; and a specific purpose area in addition to the lead-in area, the lead-out area and the user data area, wherein each of the lead-in area, the user data area and the lead-out area includes a groove and a land formed thereon, the user data area further includes data which is recorded on at least one side of the land and the groove, the groove and/or the land includes wobbles which are formed as read only data, the wobbles in the lead-in area, the user data area and the lead-out area are modulated by different modulation techniques, the wobbles in the user data area are modulated by one of a Quadrature Phase Shift Keying (QPSK) modulation technique, a frequency modulation technique, an amplitude modulation technique, a Modified Amplitude Modulation (MAM) technique, a phase modulation technique, a minimum shift keying (MSK) modulation technique and a saw tooth wobble (STW) modulation technique, the wobbles in the lead-in area and the lead-out area are modulated by at least one different modulation technique from that for the wobbles in the user data area, and the specific purpose area is a burst cutting area (BCA).

6. An optical disc for recording and/or reproduction, comprising:

a lead-in area;

a user data area;

a lead-out area; and a specific purpose area in addition to the lead-in area, the lead-out area and the user data area, wherein:

each of the lead-in area, the user data area and the lead-out area includes a groove and a land formed thereon, the lead-in area further includes a read only data area and a write/read data area, wobbles in the lead-in area, the user data area and the lead-out area are modulated by different modulation techniques, the wobbles in the user data area are modulated by one of a Quadrature Phase Shift Keying (QPSK) modulation technique, a frequency modulation technique, an amplitude modulation technique, a Modified Amplitude Modulation (MAM) technique, a phase modulation technique, a minimum shift keying (MSK) modulation technique and a saw tooth wobble (STW) modulation technique, the wobbles in the lead-in area and the lead-out area are modulated by at least one different modulation technique from that for the wobbles in the user data area, and the specific purpose area is a burst cutting area (BCA).

* * * * *

UNITED STATES PATENT AND TRADEMARK OFFICE

CERTIFICATE OF CORRECTION

PATENT NO. : RE42,431 E
APPLICATION NO. : 12/246733
DATED : June 7, 2011
INVENTOR(S) : Kyung-geun Lee et al.

It is certified that error appears in the above-identified patent and that said Letters Patent is hereby corrected as shown below:

Delete claim 1 in column 8, lines 30-47, and insert the following replacement claim 1:

--1. An optical recording and/or reproducing apparatus which records and/or reproduces data from an optical disc which includes recording layers, each layer having lead-in, user data and lead-out areas, wherein each of the lead-in, user data and lead-out areas includes a groove and a land formed thereon and wobbles in the lead-in area, the user data area, and the lead-out area are modulated by different modulation techniques, the apparatus comprising:

a laser diode which radiates light;

a collimating lens which collimates the light radiated from the laser diode;

a polarizing beam splitter which changes a path of the light according to a polarization direction of the light;

an objective lens which focuses the light onto the optical disc; and a photodetector which receives the light [uniformly] irradiated and reflected from the lead-in, user and lead-out areas having the groove and the land formed thereon.--

Signed and Sealed this
Ninth Day of August, 2011

David J. Kappos

David J. Kappos
*Director of the United States Patent and Trademark Office*